United States Patent
Malan et al.

(10) Patent No.: US 9,759,452 B2
(45) Date of Patent: Sep. 12, 2017

(54) SUPPORT STRUCTURE FOR MULTIPLE HELIOSTATS

(71) Applicant: STELLENBOSCH UNIVERSITY, Stellenbosch (ZA)

(72) Inventors: Karel Johan Malan, Stellenbosch (ZA); Paul Gauché, Stellenbosch (ZA)

(73) Assignee: STELLENBOSCH UNIVERSITY, Stellenbosch (ZA)

( * ) Notice: Subject to any disclaimer, the term of this patent is extended or adjusted under 35 U.S.C. 154(b) by 131 days.

(21) Appl. No.: 14/441,587

(22) PCT Filed: Nov. 6, 2013

(86) PCT No.: PCT/IB2013/059931
§ 371 (c)(1),
(2) Date: May 8, 2015

(87) PCT Pub. No.: WO2014/072905
PCT Pub. Date: May 15, 2014

(65) Prior Publication Data
US 2015/0292773 A1    Oct. 15, 2015

(30) Foreign Application Priority Data
Nov. 9, 2012 (ZA) .................................. 2012/08444

(51) Int. Cl.
*F24J 2/52* (2006.01)
(52) U.S. Cl.
CPC ............ *F24J 2/5203* (2013.01); *F24J 2/523* (2013.01); *F24J 2/5239* (2013.01); *F24J 2/5264* (2013.01); *Y02E 10/47* (2013.01)

(58) Field of Classification Search
CPC ... F24J 2/5203; F24J 2/5239; F24J 2/523; F24J 2/5264; Y02E 10/47; H02S 20/10;
(Continued)

(56) References Cited

U.S. PATENT DOCUMENTS 4,063,543 A * 12/1977 Hedger ...................... F24J 2/16
126/579
4,565,185 A * 1/1986 Mori ...................... F24J 2/5417
126/569

(Continued)

FOREIGN PATENT DOCUMENTS

| DE | 200 07 445 U1 | 8/2001 |
| EP | 2 136 155 A1 | 12/2009 |
| FR | 1 381 851 A | 12/1964 |

OTHER PUBLICATIONS

WO 2013/024369 A1, Sinclair, Feb. 21, 2013.*
(Continued)

*Primary Examiner* — Stanton L Krycinski
*Assistant Examiner* — Hiwot Tefera
(74) *Attorney, Agent, or Firm* — Osha Liang LLP

(57) ABSTRACT

A support structure (10) for carrying a plurality of heliostats (12) is provided. The support structure (10) includes a frame (20) formed from a number of girders (22). The frame has a triangular outer perimeter and a plurality of mountings (26) for carrying the heliostats (12) are provided along the perimeter. At least one mounting (26) is provided at or near each vertex (16) of the triangular outer perimeter of the frame (20), and at least one additional mounting (26) is provided part-way along each side (17) of the triangular outer perimeter of the frame (20).

15 Claims, 10 Drawing Sheets

(58) Field of Classification Search
CPC .......... H02S 20/20; H02S 20/30; H02S 20/32; H01L 31/0547; H01L 31/054; H01L 31/042
USPC ............... 126/600, 696, 573, 684, 688, 601, 126/605–607, 689–691, 574–578; 250/203.4; 248/237; 211/41.1
See application file for complete search history.

(56) References Cited

U.S. PATENT DOCUMENTS

| | | | | |
|---|---|---|---|---|
| 5,404,868 | A * | 4/1995 | Sankrithi | F24J 2/1052 126/604 |
| 5,829,427 | A * | 11/1998 | Gallois-Montbrun | F24J 2/405 126/581 |
| 7,669,593 | B2 * | 3/2010 | Blackmon, Jr. | F24J 2/4647 126/570 |
| 7,694,486 | B2 * | 4/2010 | Murphy | B64G 1/222 52/645 |
| 7,905,227 | B2 * | 3/2011 | Luconi | F24J 2/16 126/623 |
| 8,981,201 | B2 * | 3/2015 | Sinclair | F24J 2/38 136/243 |
| 9,494,338 | B2 * | 11/2016 | Ishida | G02B 7/182 |
| 2003/0041856 | A1 | 3/2003 | Blackmon et al. | |
| 2005/0217936 | A1 | 10/2005 | Jolicoeur et al. | |
| 2008/0236567 | A1 | 10/2008 | Hayden | |
| 2009/0007901 | A1 | 1/2009 | Luconi et al. | |
| 2009/0235975 | A1 * | 9/2009 | Shingleton | F24J 2/38 136/246 |
| 2010/0154860 | A1 * | 6/2010 | Fereday | F16M 11/10 136/245 |
| 2011/0041836 | A1 * | 2/2011 | Kussul | F24J 2/12 126/690 |
| 2011/0108019 | A1 * | 5/2011 | Minick | F24J 2/5424 126/600 |
| 2014/0110560 | A1 * | 4/2014 | Hines | F24J 2/07 250/203.4 |
| 2014/0144428 | A1 * | 5/2014 | Eisinger | F24J 2/14 126/694 |
| 2014/0150774 | A1 * | 6/2014 | Chang | F24J 2/38 126/600 |
| 2014/0150845 | A1 * | 6/2014 | Chang | F24J 2/38 136/246 |
| 2014/0299121 | A1 * | 10/2014 | Taber, Jr. | F24J 2/06 126/714 |

OTHER PUBLICATIONS

International Search Report issued in PCT/IB2013/059931 dated Feb. 17, 2014 (3 pages).
Written Opinion of the International Searching Authority issued in PCT/IB2013/059931 dated Feb. 17, 2014 (8 pages).

* cited by examiner

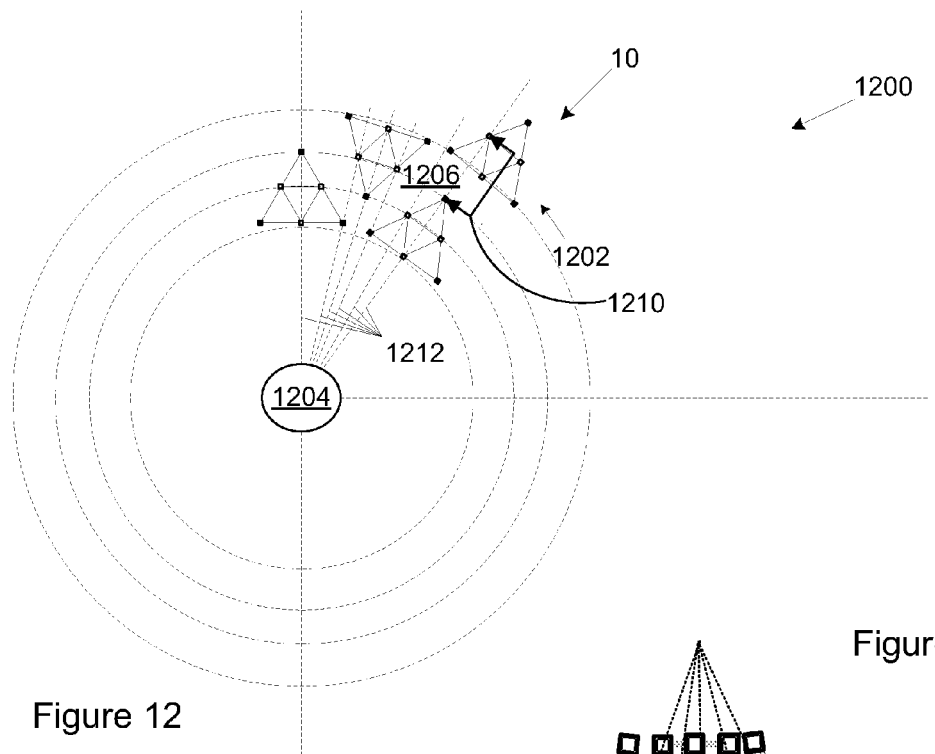
Figure 12
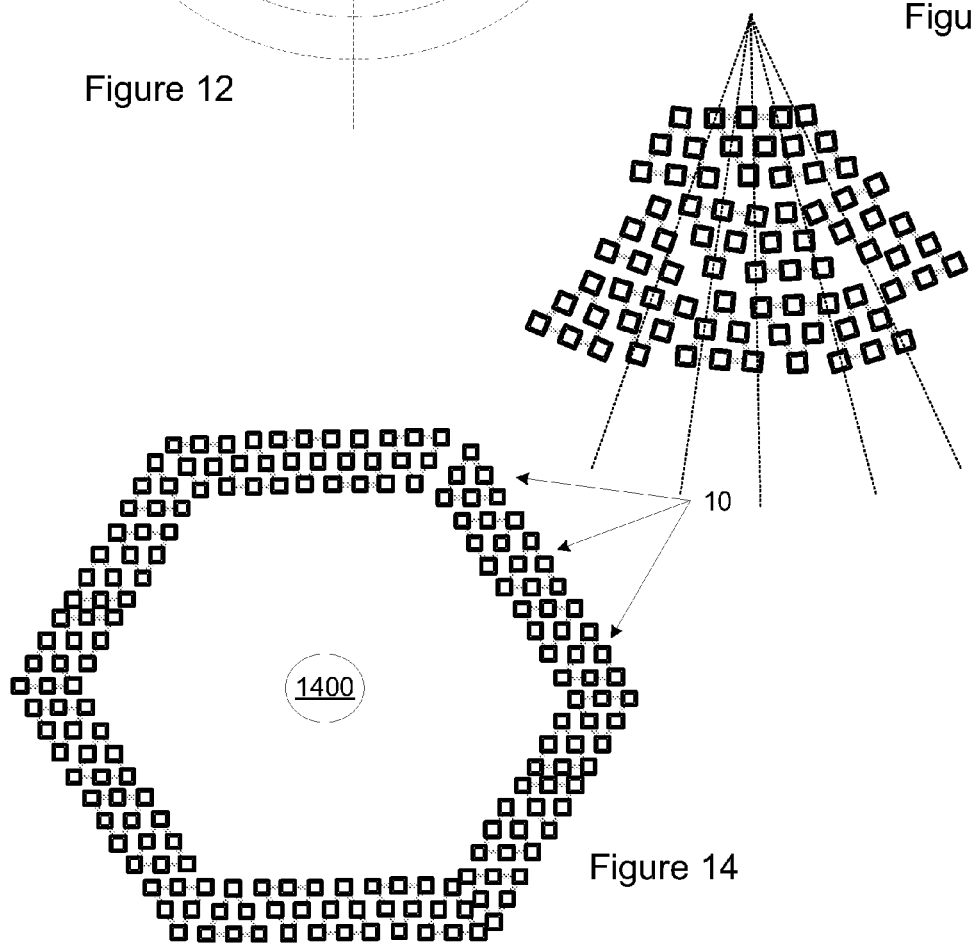
Figure 13
Figure 14

SUPPORT STRUCTURE FOR MULTIPLE HELIOSTATS

FIELD OF THE INVENTION

This invention relates to heliostats of the type used in concentrating solar energy power plants in which the sun's rays are reflected onto a solar receiver for power generation. More specifically, the invention relates to support structures for such heliostats.

BACKGROUND TO THE INVENTION

Central receiver concentrating solar energy systems include a central receiver mounted atop a tower and a field of heliostats surrounding the tower. The heliostats reflect the sun's rays onto the central receiver, which generally heats a medium to produce superheated steam or other thermodynamic working fluid which then drives a generator set to generate electricity.

Each heliostat includes a reflector assembly, which is often in the form of one or more rectangular glass mirrors, movably mounted on a support structure. The support structure is typically a steel or concrete pillar which is secured to a foundation such as a concrete block cast in a foundational hole in the ground. The reflector assembly may include a tracking mechanism which is able to control movement of the reflector so that sunlight is accurately reflected onto the stationary central receiver as the relative position of the sun changes during the day.

The construction of central receiver concentrating solar energy systems may require a significant amount of earth work in preparing the foundations for the heliostat support structures. The heliostats are expensive to manufacture and install and generally constitute about 40-50% of the total cost of existing central receiver concentrating solar energy plants. Stability of the heliostat support structures is an important requirement, because the systems must operate in strong winds and other adverse weather conditions, which is why existing heliostats are generally mounted in secure individual foundations or in a lattice-type structure. An example of a lattice-type structure is the "Sierra Suntower" system made by eSolar®.

It would be advantageous to have a heliostat support structure which is easily installed, is sufficiently stable and efficient and which is relatively cost-effective.

SUMMARY OF THE INVENTION

In accordance with the invention there is provided a support structure for carrying a plurality of heliostats, comprising a frame formed from a number of girders, characterized in that the frame has a generally triangular outer perimeter and a plurality of mountings for carrying the heliostats are provided along the perimeter with at least one mounting at or near each vertex of the triangular outer perimeter of the frame, and at least one additional mounting part-way along each side of the triangular outer perimeter of the frame.

Further features of the invention provide for the outer perimeter of the frame to be an equilateral triangle and for the frame to have six mountings, of which three mountings are at each vertex of the triangular outer perimeter and the other three mountings are mid-way along each side of the triangular outer perimeter.

Still further features of the invention provide for three girders to extend between the three mountings that are midway along each side of the triangular outer perimeter to form four smaller equilateral triangles within the triangular outer perimeter. Preferably, the support structure includes nine identical girders of which six girders extend between the vertex of the triangular outer perimeter and the three mountings midway along each side of the triangular outer perimeter, and three girders extend between each pair of the three mountings midway along each side of the triangular outer perimeter.

Yet further features of the invention provide for the frame to have a number of leg assemblies extending therefrom in a direction generally transverse to a plane formed by the triangular outer perimeter of the frame; and for at least some of the mountings and leg assemblies to be integral with each other so as to form a single pylon which attaches to the girders. In one embodiment, the support structure includes six such identical pylons and nine identical girders, so that the support structure can be assembled using only two kinds of components.

Further features of the invention provide for each girder to be a lattice beam and for the girders and the pylons to be connected together by means of projecting plates provided on either or both of the pylons and the girders and which align with cooperating apertures to receive bolts therethrough.

In an alternative embodiment, the support structure has three leg assemblies at or near each vertex of the triangular outer perimeter of the frame and six mountings, of which three mountings are at or near each vertex of the triangular outer perimeter and the other three mountings are mid-way along each side of the triangular outer perimeter, the three leg assemblies enabling the heliostat support structure to have a raised profile so that it can be placed on uneven ground.

Further features of the invention provide for the support structure to include three tethers that are each connected at one of their ends to three spaced apart points on the triangular outer perimeter and have their other ends connected together to a centrally located ground anchor, so as to anchor the support structure to the ground at a single point.

The leg assembly may each have a foot structure for resting on the ground, the foot structure including connecting formations or components so that the foot structure can be connected to a foot structure of an identical or similar adjacently placed heliostat support structure to form a stable group of heliostat support structures. In one embodiment, each leg assembly has an adjustable length enabling the heliostat support structure to have a raised profile, wherein the adjustable length is provided by telescoping members or adjustable ground screws, so that the frame can be set to a generally horizontal position when the support structure is placed on uneven or sloping ground by adjusting the lengths of the leg assemblies.

The invention extends to a concentrating solar energy system comprising a field of support structures as described, wherein the field comprises multiple rows of support structures spaced at successive distances from one or more central receiver towers, with at least some of the support structures being orientated about 180 degrees about their vertical axis relative to adjacent support structures.

Further features of the invention provide for the concentrating solar energy system to have adjacent rows of the field of support structures which are laterally shifted relative to each other so as to maximize the distances between successive rows of supported heliostats so as to minimize optical blocking by adjacent heliostats. In one embodiment, each alternate support structure in a row of support structures is orientated 180 degrees about its vertical axis relative to its neighbouring support structures.

BRIEF DESCRIPTION OF THE DRAWINGS

In the drawings:

FIG. 12 is an exaggerated top plan view of a field of heliostat support structures of the invention in which the heliostat support structures are arranged in an orderly manner radially outward so as to minimize optical blocking;

FIG. 13 is a top plan view of a field of heliostat support structures in which the heliostat support structures are in a yet further arrangement;

FIG. 14 is a top plan view of a hexagonal perimeter arrangement of heliostat support structures;

DETAILED DESCRIPTION WITH REFERENCE TO THE DRAWINGS

Figure 1:
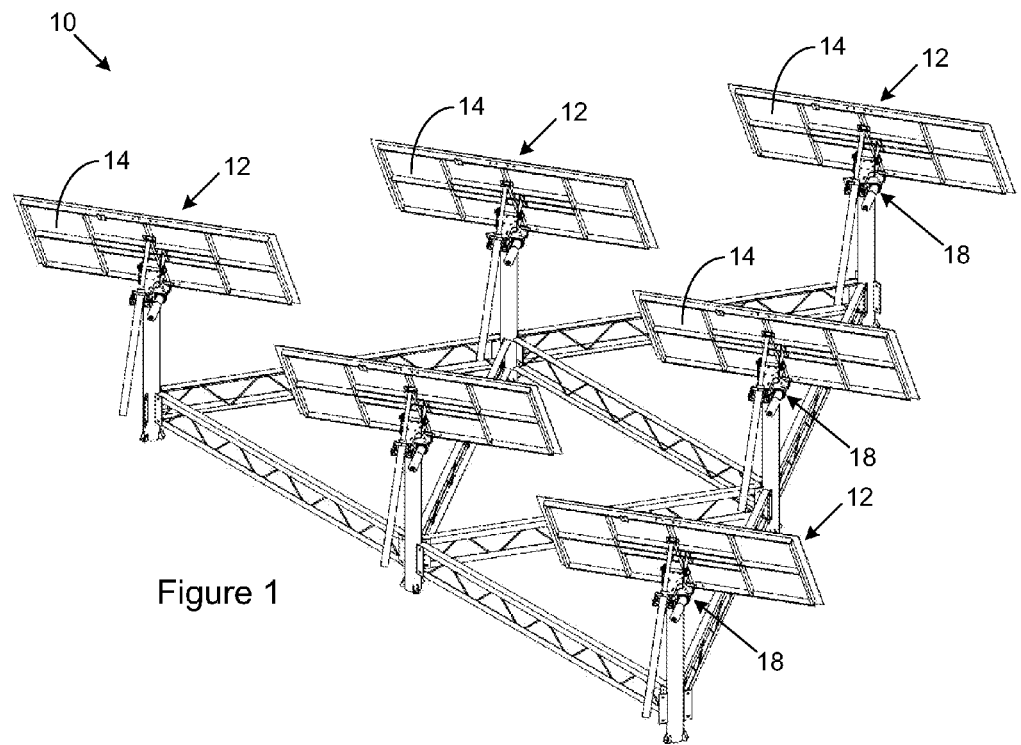
FIG. 1 is a three dimensional view of a support structure carrying multiple heliostats according to a first embodiment of the invention.

FIG. 1 shows a support structure (10) carrying a number of heliostats (12). Each heliostat includes a rectangular glass mirror (14), of which the reverse side is shown, which is movably mounted to the support structure (10) and guided by means of a tracking mechanism (18) to control movement of the heliostat so that the mirror accurately reflects the sun's light onto a stationary central receiver (not shown) as the relative position of the sun changes during the day.

Figure 2:
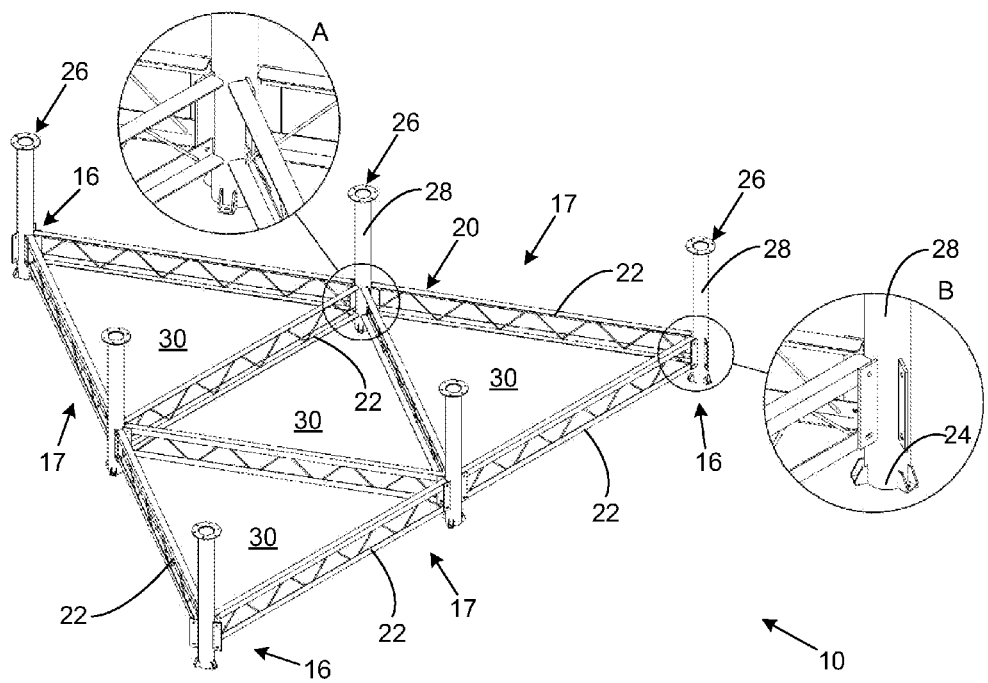
FIG. 2 is a three dimensional view of the support structure of FIG. 1 without mounted heliostats, and including detail views of certain components.
Figure 3:
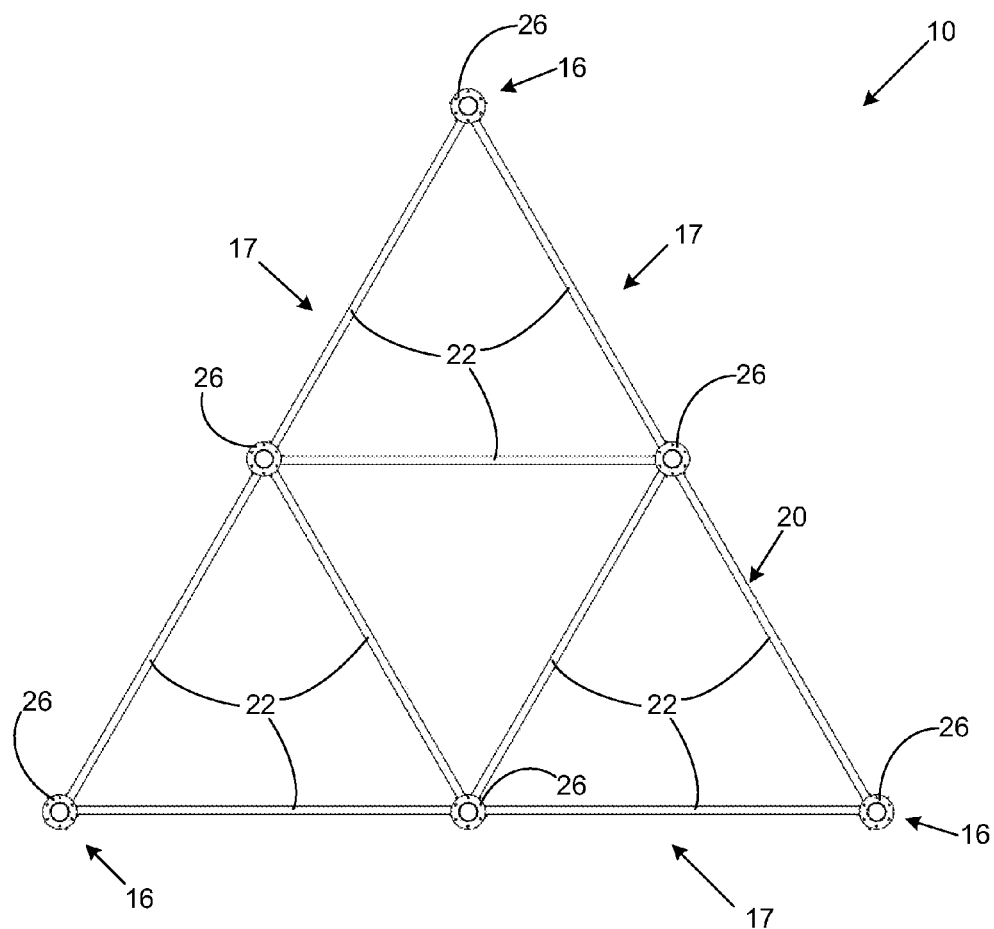
FIG. 3 is a top plan view of the support structure of FIG. 2.
Figure 4:
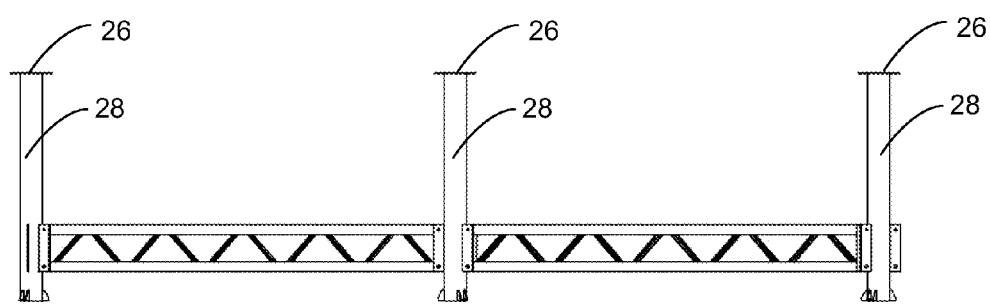
FIG. 4 is a side elevation of the support structure of FIG. 2.

FIGS. 2-4 show the support structure (10) without the mounted heliostats. The support structure (10) includes a frame (20) formed from a number of girders (22). The frame (20) has a triangular outer perimeter and a number of leg assemblies (24), one of which is shown in detail view. The leg assemblies extend from the frame in a direction generally transverse to a plane formed by the triangular outer perimeter. In this illustration, the leg assemblies extend vertically and the plane formed by the triangular outer perimeter of the frame extends horizontally.

A number of mountings (26) for carrying the heliostats (12) are provided along the perimeter of the frame (20). In this embodiment, each mounting (26) is integral with a leg assembly (24) so as to form a single pylon (28) which attaches to the girders (22). Six pylons (28) are provided, three at each vertex (16) of the triangular outer perimeter of the frame (20), and three part-way along each side (17) of the triangular outer perimeter, in this embodiment exactly midway along each side (17). The support structure (10) thus carries six heliostats (12).

In this embodiment, the outer perimeter of the frame is an equilateral triangle, and the frame is constructed from nine identical girders (22). Three girders extend between each pair of the three pylons (28) that are midway along each side of the triangular outer perimeter to form four smaller equilateral triangles (30) within the triangular outer perimeter. The remaining six girders extend between the vertex of the triangular outer perimeter and the three mountings midway along each side of the triangular outer perimeter.

Figure 5:
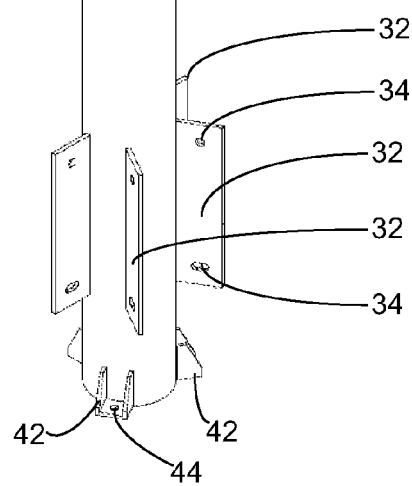
FIG. 5 is a three dimensional view of a leg assembly of the support structure of FIG. 2.
Figure 6:
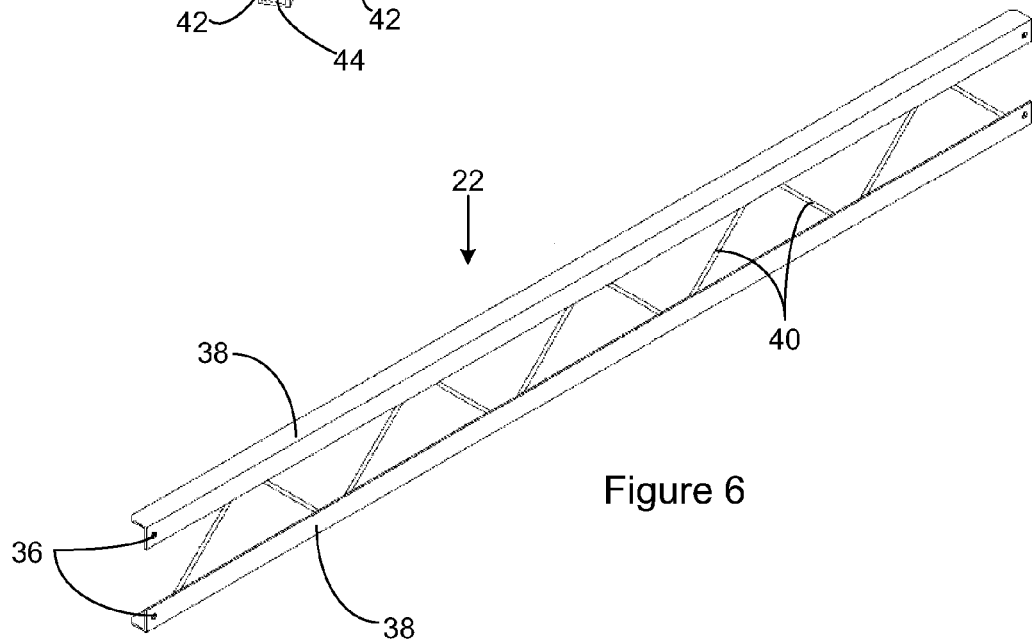
FIG. 6 is a three dimensional view of one of the girders of the support structure of FIG. 2.

In this embodiment, all nine girders are identical to each other and all six pylons are identical to each other, so that the support structure can be assembled using only two kinds of components (pylons and girders). The pylons (28) are shown in detail in FIG. 5 and the girders (22) are shown in detail in FIG. 6. As shown in FIG. 5, the pylon is in the form of an elongate metal pipe that includes projecting plates (32) which are welded onto and extend along the axis of the pylon and project in spaced radial directions therefrom. The plates (32) include apertures (34) which are sized to align with cooperating apertures (36) in the ends of each girder (22) to receive bolts therethrough. The plates are radially spaced by approximately 60 degrees so that the angle between each girder is 60 degrees so as to form the equilateral triangles.

It will be appreciated that for the three pylons that are midway along each side of the triangular outer perimeter all four projecting plates (32) are fixed to girders, as shown in inset A in FIG. 2, whereas for the three pylons that are at the vertex of the triangular outer perimeter, only two of the four projecting plates (32) are fixed to girders, as shown in inset B in FIG. 2. As shown in FIG. 5, each girder (22) is a mild steel lattice beam having two pieces of angle iron that form spaced apart elongates (38) with lightweight lattice members (40) spanning the elongates at alternating angles. The apertures (36) are formed towards the end of each of the elongates and the elongates are spaced apart the width of the projecting plates (32) so that they fit snugly thereacross.

As shown in FIG. 5, the leg assembly which forms part of the pylon (28) includes a foot structure (42) for resting on the ground. In this embodiment, the foot structure includes three projecting angle iron pieces which have an aperture (44) therein. By connecting a bridge piece (not shown) to the aperture of each foot structure (42), the foot structure of one support structure can be connected to the foot structure of an identical or similar adjacently placed heliostat support structure to form a stable interlocking group of heliostat support structures. Ground screws or anchors can also be attached to a foot structure (42) so as to secure the support structure to the ground, although in some embodiments it may not be necessary for ground anchors to be provided since sufficient stability may be obtained by interlocking a number of heliostat support structures with one another.

As shown in FIG. 5, the mounting (26) on the pylon (28) is in the form of a radially projecting rim (30) which forms a connection flange and has a number of apertures (31) by means of which a heliostat can be bolted to the pylon (28).

It will be appreciated that the heliostat support structure (10) according to the embodiment of FIGS. 1 to 6 may be made in any appropriate size. In one illustrative example, each girder (22) is about 2.5 m in length so that each side of the outer equilateral triangular perimeter is 5 m in length. The pylons (28) may suspend the frame by about 150 mm from the ground, with all six foot structures (42) resting on the ground. The heliostat support structure (10) may also be made from any suitable material, in one embodiment from galvanised welded assemblies constructed from mild steel sections.

Figure 7:
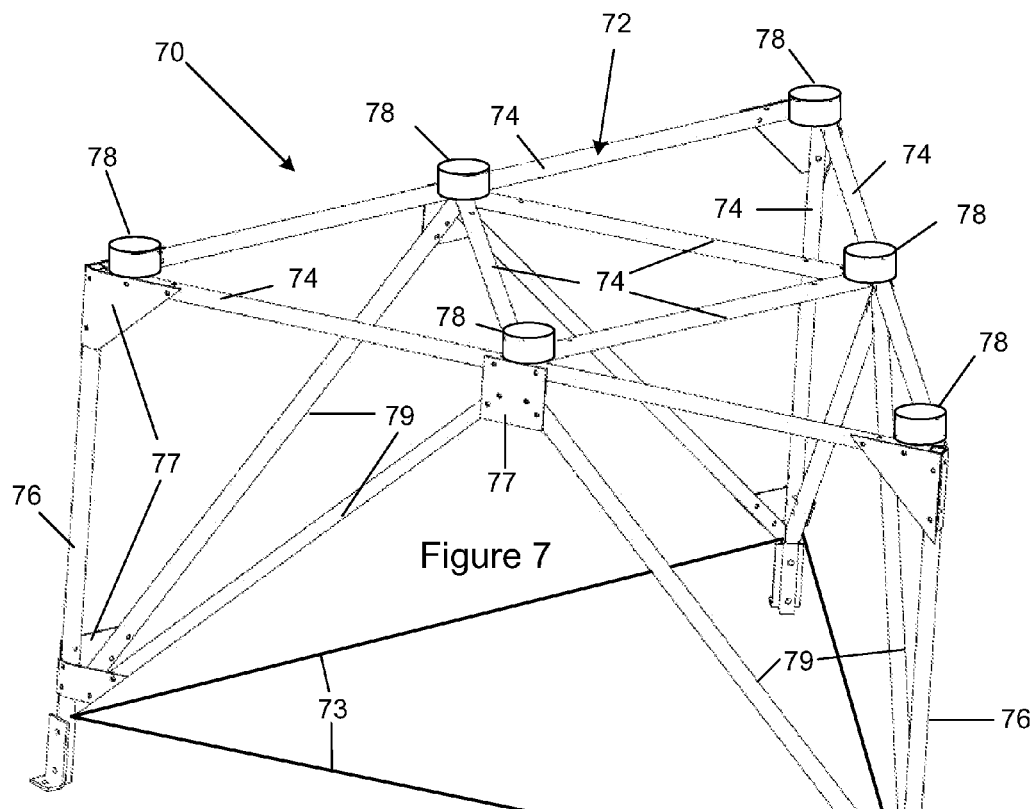
FIG. 7 is a three dimensional view of a support structure for multiple heliostats according to a second embodiment of the invention.

FIG. 7 shows an alternative embodiment of a support structure (70) for carrying a number of heliostats according to the invention. The support structure (70) includes a frame (72) formed from a number of girders (74).

The frame (70) has a triangular outer perimeter and a number of leg assemblies (76). The leg assemblies extend from the frame in a direction generally transverse to a plane formed by the triangular outer perimeter, the leg assemblies extending vertically and the plane formed by the triangular outer perimeter of the frame extending horizontally. A number of mountings (78) for carrying heliostats are provided along the perimeter of the frame (72). In the exemplary illustration the mountings are simple socket-type couplings, but could be any other appropriate mounting or attachment, such as clips, projecting tongues or the like, and may also include fastening means such as bolts for securely fastening the heliostats in place.

In the embodiment of FIG. 7, the support structure (70) has three leg assemblies (76) at each vertex of the triangular outer perimeter, and six mountings, three at each vertex of the triangular outer perimeter of the frame (72), and three mid-way along each side of the triangular outer perimeter. The three leg assemblies enable the heliostat support structure to have a raised profile so that it can be place on uneven ground. In this embodiment, the girders (74) are sections of piping, rather than lattice members, and additional struts (79) are provided which extend between a lower part of each leg assembly (76) and a point adjacent each mounting (78). Additional optional trusses or components may be provided to further stabilize the structure by closing or completing uncompleted triangles. For example, in FIG. 7, a cable (73) is spanned between the leg assemblies (76) at their lower ends to complete the uncompleted triangles between the additional struts (79). In another embodiment, a very light bar may be spanned between the leg assemblies (76) at their lower ends to complete the uncompleted triangles between the additional struts (79). In the illustrated embodiment, the leg assemblies (76) and additional struts (79) are fastened to the frame by means of plate structures (77) which are cut to the appropriate size and fastened by means of bolting, riveting or welding. In other variations, the leg structures, frame and additional struts could be angle iron members in which case no plates would be required.

Figure 8:
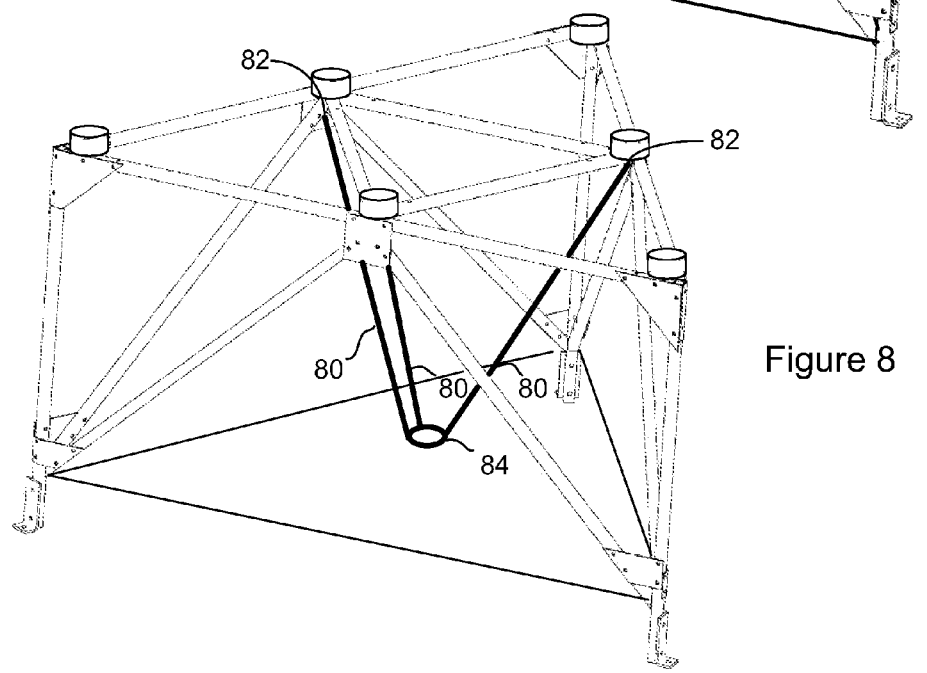
FIG. 8 is similar to FIG. 7 but includes three tethers for anchoring the support structure to the ground at a single central point.

FIG. 8 is similar to FIG. 7 but includes three tethers (80) that are each connected at one of their ends to three spaced apart points (82) on the triangular outer perimeter and have their other ends connected together to a centrally located point, in this case a ring (84), which in turn is connected to a ground anchor such as a ground screw (not shown) so as to anchor the support structure to the ground at a single point. This configuration has the benefit that only one anchor point is required, which may facilitate speedy installation.

The tethers could be cables, ropes or webbing and could be made from any suitable material including steel or plastics material.

Figure 9:
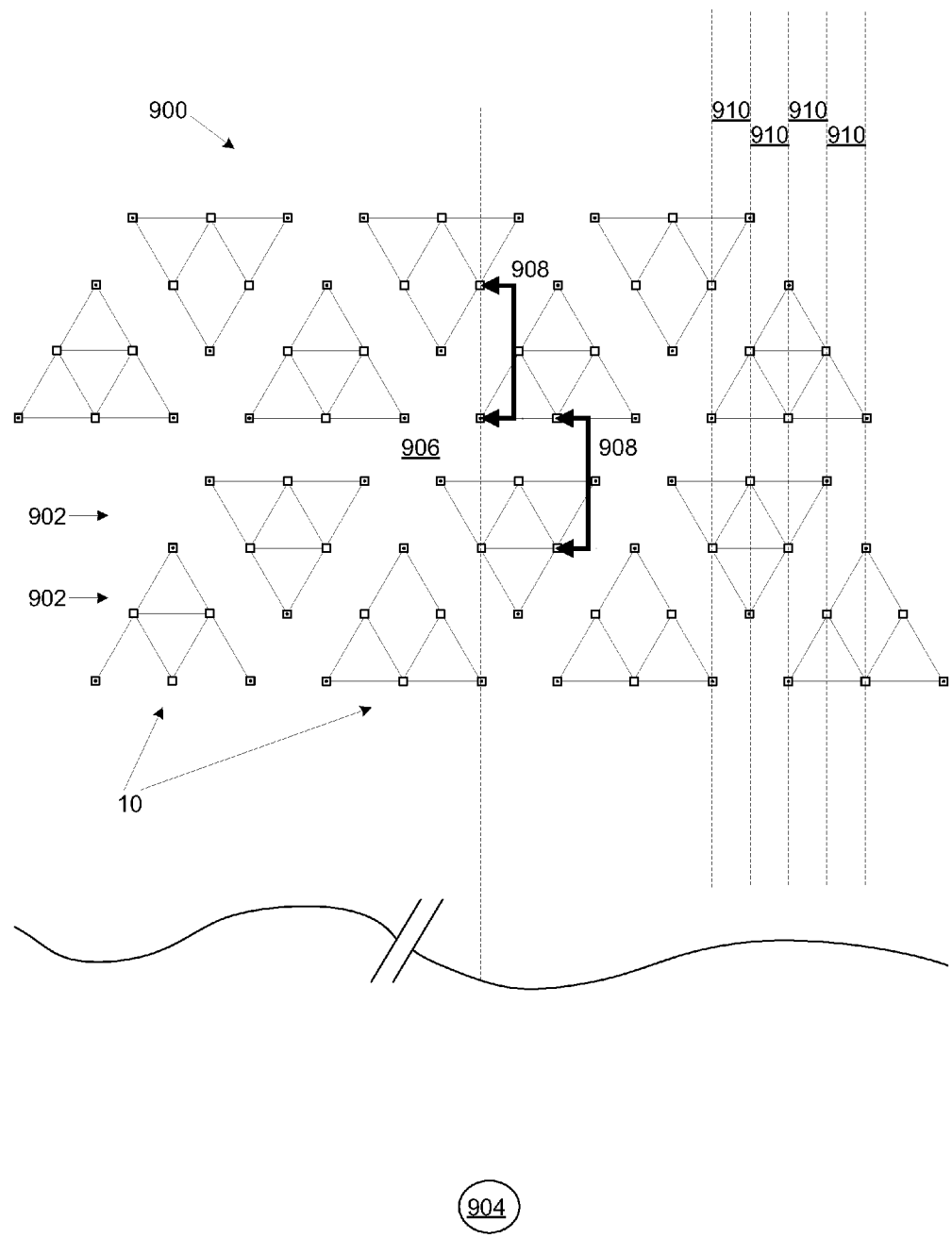
FIG. 9 is a top plan view of a plurality of heliostat support structures arranged so as minimize optical blocking.

The invention extends to a concentrating solar energy system comprising a field of support structures as previously described. FIG. 9 illustrates a portion (900) of a large field of heliostat support structures (10). The field includes multiples rows (902) of support structures spaced at successive distances from a central receiver tower (904), with at least some of the heliostat support structures being orientated 180 degrees about their vertical axis relative to adjacent structures. Spaces (906) are provided between adjacent heliostat support structures so as to allow for easy access to each heliostat (not shown) for cleaning and maintenance purposes. A lateral shift is introduced between adjacent rows of heliostat support structures resulting in an overlap between each row, the magnitude of which is determined so as to maximize the distance (908) between collinear heliostats so as to minimize optical blocking by adjacent heliostats.

The advantage of having six heliostats arranged around the perimeter of an equilateral triangle frame and spacing adjacent frames in the manner described above, is that the spacing (910) between the generally parallel lines of sight from the heliostat mirrors to the central receiver tower may be equal, while the distance (908) between collinear heliostat mirrors is maximized. This makes it possible to make each heliostat mirror as large as possible without blocking its adjacent mirror, and allows for a tiling approach in which almost all of the available space for reflecting sunlight from the perspective of the tower can be utilized.

Figure 10:
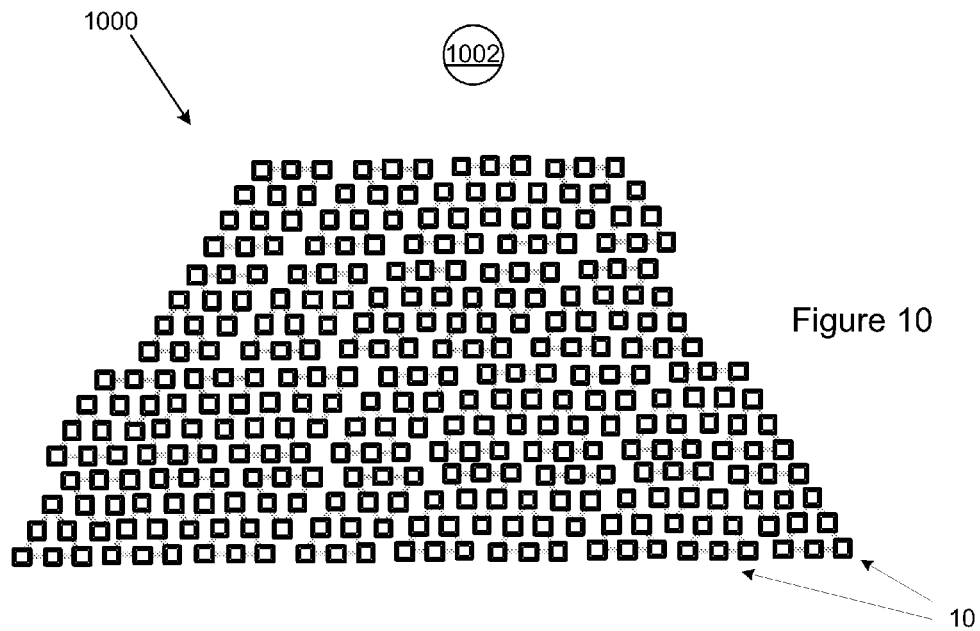
FIG. 10 is a top plan view showing a sector of a field of heliostat support structures in the arrangement of FIG. 9.

FIG. 10 shows how a heliostat support structure arrangement similar to that of FIG. 9 may be expanded to form a sector (1000) around a central receiver tower (1002). The shape of the sector is such that similar sectors could be placed in a wagon wheel-type arrangement around the central receiver tower (1002) so as to surround the central receiver tower with heliostat support structures.

Figure 11:
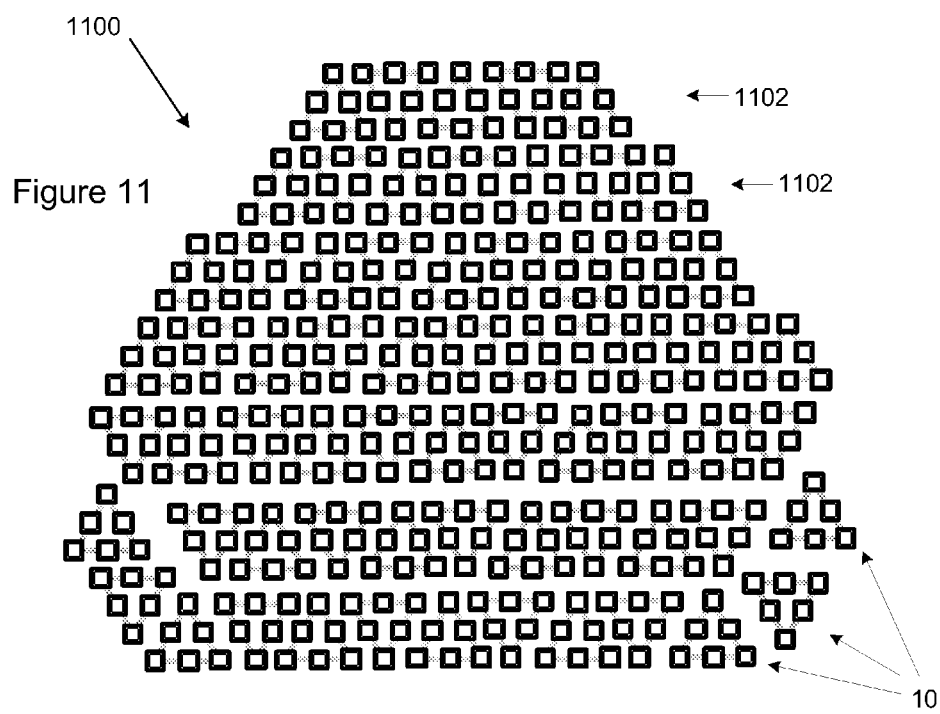
FIG. 11 is a top plan view showing a sector of a field of heliostat support structures in another arrangement.

FIG. 11 shows a sector (1100) which is similar to that of FIG. 10, differing in that the adjacent rows (1102) of heliostat support structures (10) are not laterally shifted in the manner of FIGS. 9 and 10. Instead the rows (1102) are arranged with each alternate heliostat support structure in the row is orientated 180 degrees about its vertical axis relative to its neighbour, with mounts for heliostats on the vertices and midpoints being aligned.

FIG. 12 shows a portion (1200) of a field of heliostat support structures (10) according to embodiments of the invention, where the rows (1202) of heliostat support structures are spaced at successive distances from the central receiver tower (1204) in an exaggerated circular formation (1206). At least some of the heliostat support structures are orientated 180 degrees about their vertical axis relative to adjacent structures. Spaces are provided between adjacent heliostat support structures so as to allow for easy access to each heliostat for cleaning and maintenance purposes. A horizontal overlap is introduced between adjacent rows of heliostat support structures, the magnitude of which is determined so as to maximize the distance (1210) between radially aligned (1212) heliostats so that optical blocking by adjacent heliostats may be minimized.

Depending on the layout of the field of heliostat support structures there may be an optimal solution to the arrangement of heliostat support structures such that solar energy reflected in the direction of the central receiver tower is maximised. This optimal solution would not necessarily result in the heliostat support structure arrangement of FIG. 12, but may take on a less orderly arrangement as illustrated by means of a non-limiting example in FIG. 13. While it would appear from this top down view that optical blocking might occur, the solution would be one that ensures that overall optical blocking is in fact minimised. Computer modelling may be able to determine optimal layouts.

Figure 15:
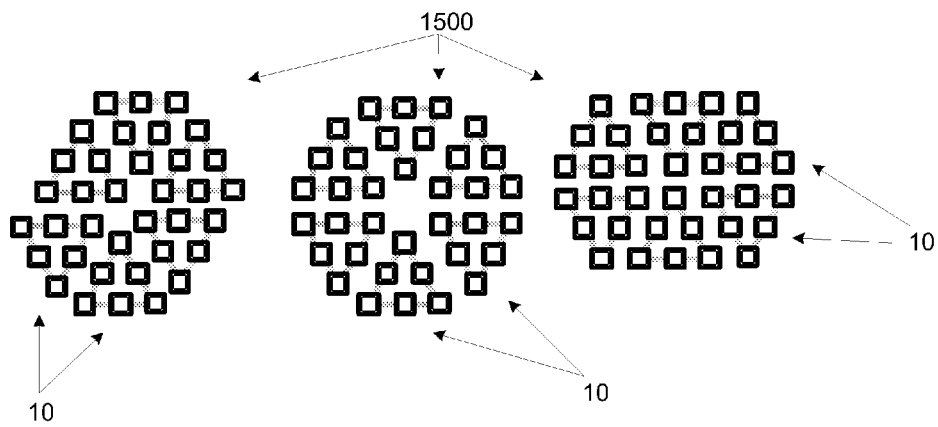
FIG. 15 is a top plan view showing three different cluster arrangements of heliostat support structures.

There are, of course, many other arrangements of heliostat support structures which might be used in fields of heliostats. FIG. 14 shows another such arrangement, in which a hexagonal perimeter of heliostat support structures (10) is formed around a central receiver tower (1400). The arrangement could be expanded by adding a plurality of concentric hexagonal perimeter arrangements. Alternatively, it might be advantageous for the heliostat field to comprise clusters (1500) of heliostat support structures (10) as illustrated in FIG. 15. The clusters could take on various shapes which are easily formed as a result of the heliostat support structure's triangular shape. FIG. 15 shows, by way of non-limiting example, three different cluster arrangements that might be used.

Figure 16:
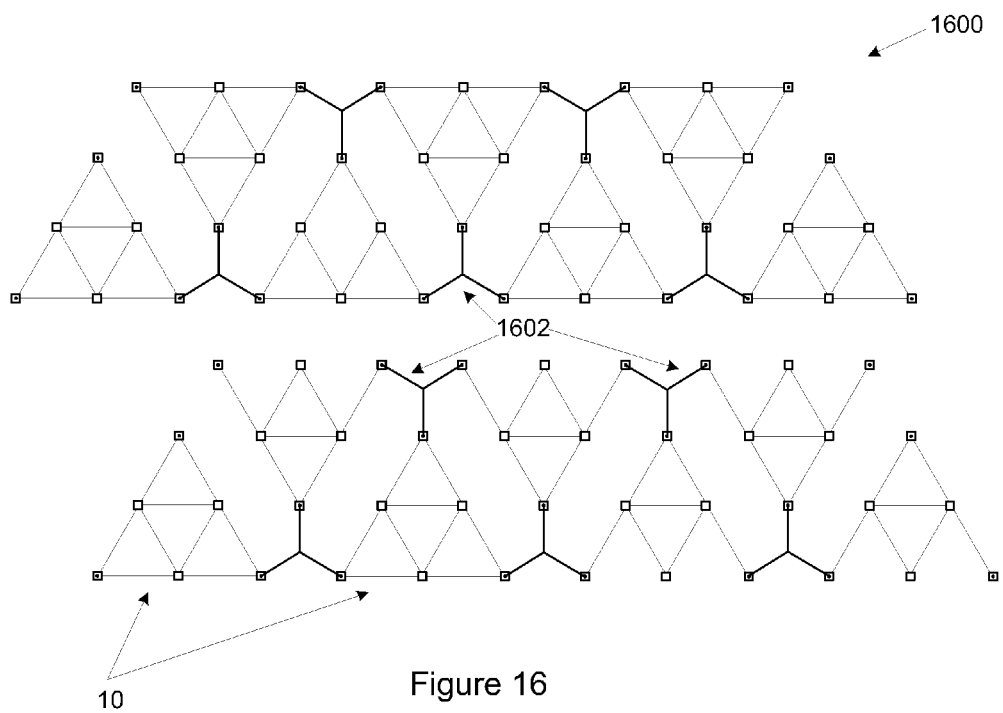
FIG. 16 is a top plan view of a field of interconnected heliostat support structures.

FIG. 16 shows a portion (1600) of a field of heliostat support structures in which some of the foot structures of the support structures (10) are connected to foot structures of adjacently placed support structures to form a stable group of heliostat support structures. The connecting formation (1602) might be implemented in any of the arrangements previously discussed.

Figure 17:
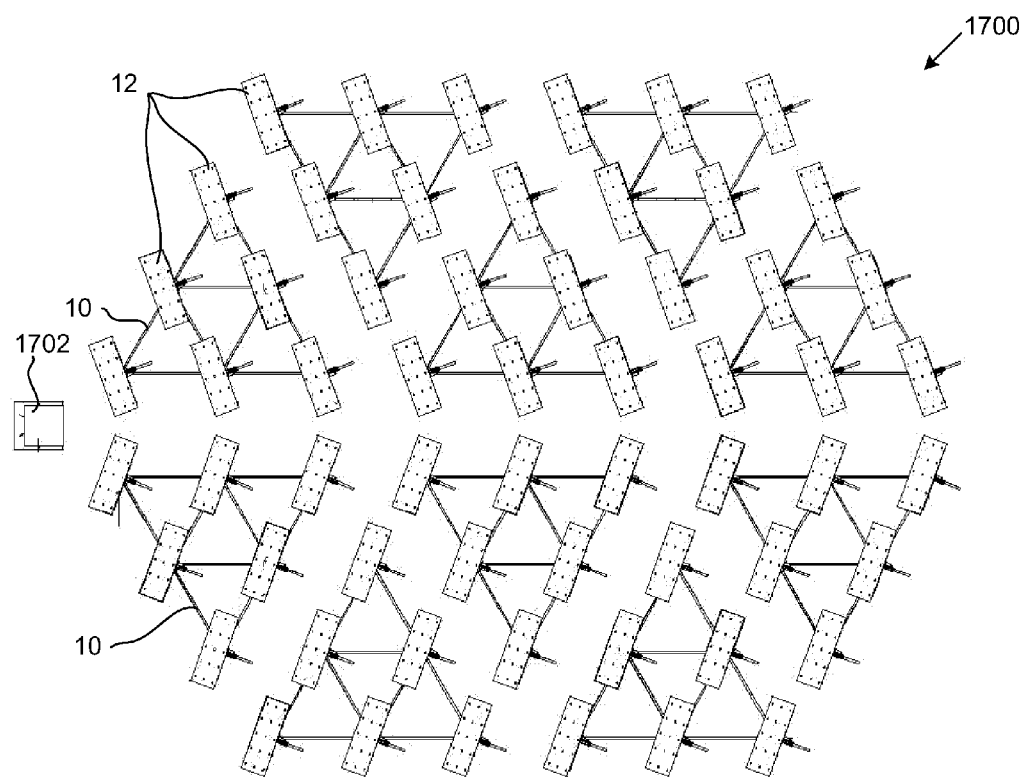
FIG. 17 is a top plan view of a cluster of heliostats.
Figure 18:
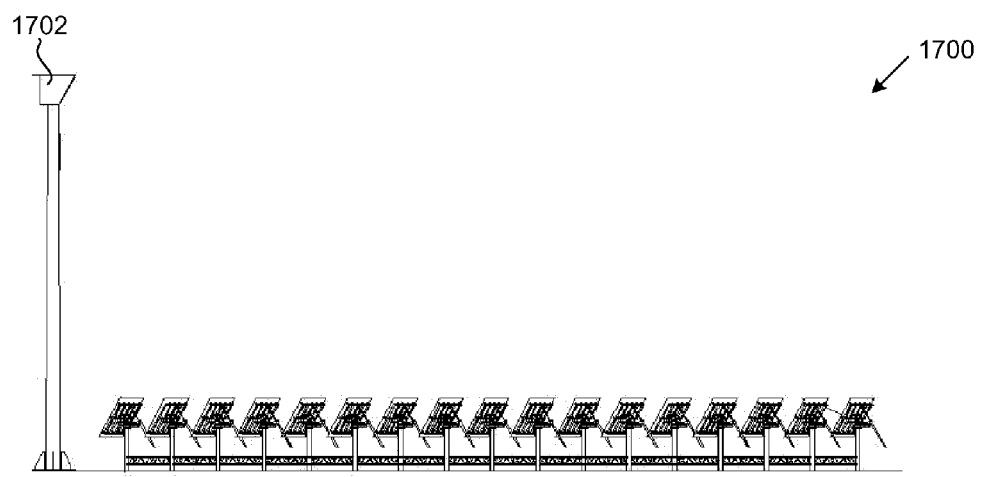
FIG. 18 is a side view of a cluster of heliostat support structures.

Yet a further arrangement of heliostat support structures according to embodiments of the invention is illustrated in FIG. 17. The figure illustrates a cluster (1700) of heliostat support structures (10). Heliostats (12), which are mounted on the support structures (10), are configured to direct the sun's rays towards a central receiver tower (1702). The support structures (10) of the cluster (1700) are arranged in four rows, two of which overlap. The two inner rows are on either side of a radius extending from the central receiver tower (1702) with sides of the support structures being parallel to sides of support structures in the opposing inner row. Each inner row has three support structures (10). The two outer rows overlap with their respective adjacent inner rows, with the support structures of the outer rows being oriented 180 degrees about their vertical axis relative to heliostat support structures in the adjacent inner row. The outer rows each have two support structures. FIG. 18 shows a side view of the cluster (1700) of heliostat support structures described above with reference to FIG. 17.

Figure 19:
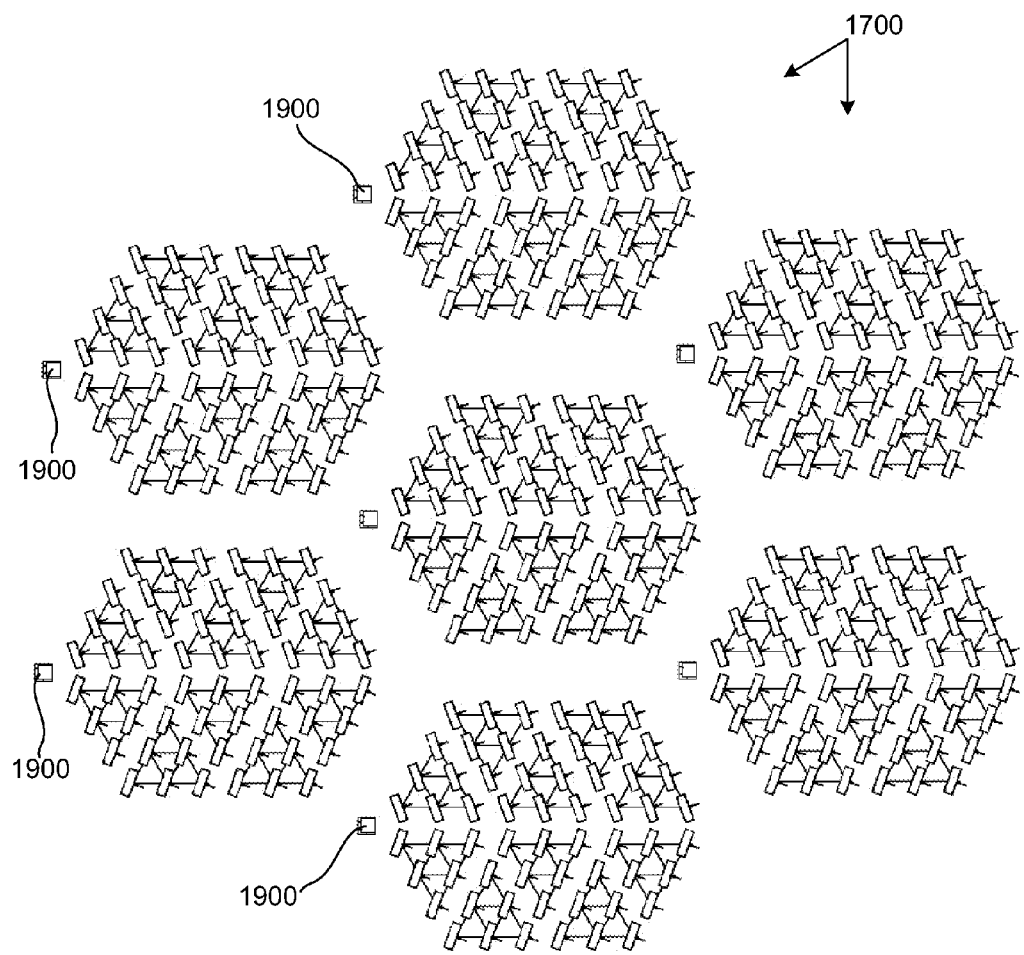
FIG. 19 is a top plan view of several clusters of heliostats each with their own central receiver.

FIG. 19 illustrates a field of heliostat support structures having a plurality of central receiver towers (1900) and a plurality of clusters (1700) as described above with reference to FIGS. 16 and 17.

The invention is not limited to the described embodiments and numerous variations may be made without departing from the scope of the appended claims. For example, each leg assembly may have an adjustable length enabling the heliostat support structure to have a raised profile, wherein the adjustable length is provided by telescoping members or adjustable ground screws, so that the frame can be set to a generally horizontal position when the support structure is placed on uneven or sloping ground by adjusting the lengths of the leg assemblies.

The invention therefore provides a support structure for multiple heliostats that does not need an individual foundation or ground preparation, and in which optical efficiency is improved as described above. The support structure of the invention improves field layout flexibility, as support structures can be staggered with near-uniform spacing while allowing for curvature around the receiver tower and keeping each heliostat aimed at the tower. Ease of access to each support structure facilitates cleaning of the heliostat mirror, and the units can be assembled and densely stacked at the factory or transported in parts to the installation site and installed and anchored in place quickly and easily.

The invention claimed is:

1. A concentrating solar energy system comprising a field of support structures carrying heliostats, each support structure including a frame formed from a number of girders, the frame having a generally triangular outer perimeter and a plurality of mountings provided along the outer perimeter for carrying the heliostats, with a respective one of the plurality of mountings at or near each vertex of the triangular outer perimeter of the frame, wherein the field comprises multiple rows of the support structures spaced at successive distances from a central receiver tower, with the support structures of each row being orientated about 180 degrees about a vertical axis relative to the support structures of a respective adjacent row of the support structures, and with adjacent rows of the support structures being laterally shifted relative to each other so that spacing between respective lines of sight normal to a vertical plane of a front of the central receiver tower from the carried heliostats to the central receiver tower is generally equal, and a distance between collinear heliostats in successive rows of said multiple rows is configured to be maximized, to thereby enable a tiling approach in which substantially all available space for reflecting sunlight from a perspective of the central receiver tower can be utilized without optical blocking between the heliostats.

2. The concentrating solar energy system as claimed in claim 1, wherein the outer perimeter of the frame is an equilateral triangle and the frame of each support structure has six of the plurality of mountings, of which three of the six mountings are at a respective said vertex of the triangular outer perimeter and the other three of the six mountings are midway along a respective side of the triangular outer perimeter.

3. The concentrating solar energy system as claimed in claim 2, wherein each support structure has three of the number of girders extending between respective pairs of the three mountings that are midway along the respective side of the triangular outer perimeter to form four smaller equilateral triangles within the triangular outer perimeter.

4. The concentrating solar energy system as claimed in claim 3, wherein each support structure includes nine of the number of girders which are identical, and of which six of the nine girders extend between the respective vertices of the triangular outer perimeter and respective ones of the three mountings midway along the respective sides of the triangular outer perimeter, and the other three of the nine girders are the three girders extending between the respective pairs of the three mountings midway along the respective side of the triangular outer perimeter.

5. The concentrating solar energy system as claimed in claim 1, in which the frame of each support structure has a number of leg assemblies extending therefrom in a direction generally transverse to a plane formed by the triangular outer perimeter of the frame.

6. The concentrating solar energy system as claimed in claim 5, wherein at least some of the plurality of mountings and number of leg assemblies are respectively integral with each other so as to form a respective single pylon which attaches to the number of girders.

7. The concentrating solar energy system as claimed in claim 6, wherein each support structure includes six of the single pylons which are identical and nine of the number of girders which are identical, so that each support structure can be assembled using only two kinds of components, the first kind of components being the six single pylons, and the second kind of components being the nine girders.

8. The concentrating solar energy system as claimed in claim 6, wherein each girder is a lattice beam and wherein the number of girders and the single pylons are connected together by means of projecting plates provided on either or both of the single pylons and the number of girders and which align with cooperating apertures to receive bolts therethrough.

9. The concentrating solar energy system as claimed in claim 5, wherein each support structure has three of the number of leg assemblies at or near a respective said vertex of the triangular outer perimeter of the frame and six of the plurality of mountings, the three leg assemblies enabling each support structure to have a raised profile so that each support structure can be placed on uneven ground.

10. The concentrating solar energy system as claimed in claim 9, wherein each support structure includes three tethers that are each connected at one of their ends to a respective one of three spaced apart points on the triangular outer perimeter, and each of the three tethers has their other end each connected together to a centrally located ground anchor, so as to anchor the support structure to the ground at a single point.

11. The concentrating solar energy system as claimed in claim 5, wherein each leg assembly has a foot structure for resting on the ground, the foot structure including connecting formations or components so the foot structure can be connected to a foot structure of an identical or similar adjacently placed support structure of the support structures to form a stable group of the support structures.

12. The concentrating solar energy system as claimed in claim 5, wherein each leg assembly has an adjustable length enabling each support structure to have a raised profile, wherein the adjustable length is provided by telescoping members or adjustable ground screws, so that each frame can be set to a generally horizontal position when the support structures are placed on uneven or sloping ground by adjusting the lengths of the leg assemblies.

13. The concentrating solar energy system as claimed in claim 1, wherein each support structure has at least one additional mounting part way along each side of the triangular outer perimeter of the frame.

14. The concentrating solar energy system as claimed in claim 2, wherein adjacent rows of said multiple rows of support structures are laterally shifted relative to each other so that one of the heliostats carried at the vertex of the triangular outer perimeter of the frame of the support structure in one row of the adjacent rows is collinear with the respective heliostat carried midway along the respective side of the frame in other rows of the adjacent rows.

15. The concentrating solar energy system as claimed in claim 1, in which the distance between each collinear heliostat in the successive rows is the same.

* * * * *